United States Patent
Boesten et al.

[15] 3,683,002
[45] Aug. 8, 1972

[54] OPTICAL SEPARATION OF METHIONINE NITRILE

[72] Inventors: Wilhelmus H. J. Boesten, Sittard; Geertrudes H. Suverkropp, Geleen, both of Netherlands

[73] Assignee: Stamicarbon N.V., Heerlen, Netherlands

[22] Filed: Feb. 10, 1969

[21] Appl. No.: 798,156

[30] Foreign Application Priority Data

Feb. 8, 1968    Netherlands..............6801823

[52] U.S. Cl. ....260/465.5 R, 260/465 D, 260/561 A, 260/534 S
[51] Int. Cl............................................C07c 121/42
[58] Field of Search...................260/465.5, 465 D, 260/465.5 R

[56] References Cited

UNITED STATES PATENTS 2,542,768    2/1951    Gresham et al.....260/465.5 X
3,131,210    4/1964    Hugel et al. ............260/465.5

OTHER PUBLICATIONS

Karrer, Organic Chemistry, 2nd Ed., pp. 92–102 (1946)

Primary Examiner—Joseph P. Brust
Attorney—Cushman, Darby & Cushman

[57]    ABSTRACT

A process for preparing optically active methionine, methionine nitrile, and methionine amide is disclosed. A mixture of L- and D-methionine nitrile is at least partially converted to a salt of optically active α-phenoxypropionic acid, and the resulting salt is subjected to optical separation by crystallization. The resultant optically active methionine nitrile may be converted into methionine or methionine amide. Optically active methionine or methionine amide is useful as a food and feed supplement.

6 Claims, No Drawings

OPTICAL SEPARATION OF METHIONINE NITRILE

The present invention relates to a process of preparing optically active methionine nitrile ($\gamma$-methylmercapto-$\alpha$-aminobutyronitrile) or a derived compound, by subjecting a mixture of L- and D-methionine nitrile to optical separation.

The expression "mixture of L- and D-methionine nitrile" as used herein is meant to include the racemate of methionine nitrile and mixtures of the racemate with the L- and/or D-isomer. Methionine nitrile can be converted to methionine by acid or alkaline hydrolysis, which means that the present process is of importance for the preparation of optically active methionine. No suitable method has been known so far for the preparation of optically active methionine from optically inactive methionine. It is also possible to convert methionine nitrile to methionine amide by partial hydrolysis, so that the optical separation of methionine nitrile is also of importance for the preparation of optically active methionine amide.

Optically active methionine and methionine amide have a number of uses. Such uses include that of a food and feed supplement, as methionine is an essential amino acid, and also in biological transmethylation processes.

It has now been found that the optical separation of methionine nitrile can be carried out by salt formation with optically active $\alpha$-phenoxypropionic acid, and that in this process it is not necessary to convert to the salt all of the methionine nitrile to be separated, but also partial conversion will suffice.

The process according to the invention is characterized in that for the optical separation the mixture of L- and D-methionine nitrile is, wholly or partly, converted into the salt of methionine nitrile and optically active $\alpha$-phenoxypropionic acid, and subsequently a fraction mainly consisting of one of the diastereo isomers of the salt is isolated from the resulting reaction mixture.

The process according to the invention is based on the fact that, if the salt is formed with D-$\alpha$-phenoxypropionic acid, the salt of D-methionine nitrile (DD-salt) proves to be much less soluble than the salt of L-methionine nitrile (LD-salt), while, if the salt is formed with L-$\alpha$-phenoxypropionic acid, the salt of L-methionine nitrile (LL-salt) proves much less soluble than the salt of D-methionine nitrile (DL-salt).

In the present process, various methods known in themselves can be applied to separate the $\alpha$-phenoxypropionic acid salts. By preference the salt formation is effected in a solvent, and the less soluble salt separated from the solution through crystallization. Suitable solvents are benzene, toluene, and a mixture of the two, which are capable of giving highly satisfactory results, as regards both the optical purity of the isolated salt and the efficiency of the process. However, any inert organic liquid which exhibits a solvent effect for one of the salt isomers and a non-solvent effect for the other salt isomer may be used.

The resulting solid DD- or LL-salt can be separated into its components in various ways, e.g., by mixing the solid salt with benzene, toluene ether, or other inert organic liquids, and passing gaseous ammonia through the resulting suspension. The ammonium salt of $\alpha$-phenoxypropionic acid is then precipitated and can be separated from the liquid phase, in which the methionine nitrile is dissolved. The resulting ammonium salt of the $\alpha$-phenoxypropionic acid can be re-used as such in the salt formation, since the ammonia, which in this case is released in the salt formation, can be easily removed.

The reaction between the mixture of L- and D-methionine nitrile and optically active $\alpha$-phenoxypropionic acid may be at low temperatures or elevated temperatures, e.g., 0° C to 50° C, but is conveniently conducted at room temperature. Likewise, the salt formation may proceed under reduced or elevated pressures, but atmospheric pressure is preferred.

The mother liquor remaining after the solid DD- or LL-salt has been separated out can be worked up, for instance by precipitating, with gaseous ammonia, the $\alpha$-phenoxypropionic acid as the ammonium salt. If the preparation of optically active methionine is the object, the separation of the optically active salt may be combined with the conversion of methionine nitrile to methionine. In the preparation of optically active methionine amide, the separation of the optically active salt may be combined with the conversion of methionine nitrile into methionine amide. In the following examples the invention will be further explained without being restricted to the cases described.

EXAMPLE I

To a solution of 45.2 grammes of D-$\alpha$-phenoxypropionic acid in 400 millilitres of benzene there is added slowly, at room temperature and with stirring, 35.4 g of DL-methionine nitrile. The methionine nitrile addition stirring is continued for half an hour, and the resulting crystal mass is then filtered off. After this filtration, the crystal mass is washed three times with 15 ml of benzene on the filter, and then dried.

The product obtained consists of 35.0 g of DD-salt (yield 87 percent), having a specific rotation of:

$|\alpha|_D^{20} = +13.5°$ (C=3; 100% ethanol)

The specific rotation of optically pure DD-salt, which can be determined by recrystallizing DD-salt from benzene until the specific rotation no longer changes as a result of the recrystallization, amounts to:

$|\alpha|_D^{20} = +12.8°$ (C=3; 100% ethanol)

The specific rotation of the salt of racemic methionine nitrile and D-$\alpha$-phenoxypropionic acid is:

$|\alpha|_D^{20} = +20.8°$ (C=3; 100% ethanol)

From these three specific rotation values it follows that the DD-salt obtained (35 g) has an optical purity of 95.5 percent (95.5 percent of optically pure DD-salt and 4.5 percent of optically pure LD-slat).

EXAMPLE II

A reaction mixture obtained by Strecker-type synthesis from $\beta$-methylmercaptopropion aldehyde and containing 72 percent by weight of DL-methionine nitrile, 8 percent by weight of ammonia, and 15 percent by weight of water, is extracted with benzene. The solution of methionine nitrile in benzene obtained upon extraction is thereafter subjected to evaporation at 25° C under reduced pressure, until the remaining liquid residue contains 95 percent by weight of DL-methionine nitrile.

18.6 grammes of this liquid residue is slowly added at room temperature and, with stirring, to a solution of 22.6 g of L-α-phenoxypropionic acid in 200 ml of benzene. After addition of the liquid residue, stirring is continued for half an hour, and subsequently the resulting crystal mass is filtered off. The crystal mass obtained is washed three times with 15 ml of benzene on the filter, and then dried.

The product consists of 15.3 g of LL-salt (yield 76 percent) having a specific rotation of:

$|\alpha|_D^{20} = -14.0°$ (C=3; 100% ethanol)

This specific rotation corresponds to an optical purity of 92.5 percent.

EXAMPLE III

To a solution of 11.3 g of L-α-phenoxypropionic acid in 150 ml of toluene there is added slowly, at room temperature and with stirring, 17.7 g of DL-methionine nitrile. After this addition of methionine nitrile, stirring is continued for half an hour, and then the resulting crystal mass is filtered off. The crystal mass thus obtained is washed three times with 15 ml of toluene on the filter and then dried.

The resulting product consists of 17.9 g of LL-salt (yield 89 percent), having a specific rotation of:

$|\alpha|_D^{20} = -13.2°$ (C=3; 100% ethanol)

This specific rotation corresponds to an optical purity of 97.5 percent.

EXAMPLE IV 14.8 g of optically pure LL-salt, obtained by recrystallization of the not completely optically pure LL-salt of Example III with benzene to constant specific rotation, is dissolved in 50 ml of water. The resulting solution is acidified at room temperature with 2 ml of 96 percent by weight sulphuric acid, and the L-α-phenoxypropionic acid released in the process is extracted with ether. From the remaining acid aqueous solution of methionine nitrile, 31.6 ml of water is removed by evaporation. After addition of 12 g of sulphuric acid (concentration 96 percent by weight) to the residue, the mixture is boiled for one hour with reflux, so that the methionine nitrile hydrolyzes to form methionine. Thereafter the resulting acid solution, cooled and diluted to a volume of 150 ml, is passed over a DOWEX 50 (trade mark) ion exchanger in the H⁺ form, when the methionine is bound to the ion exchange resin. After the ion exchange resin has been washed with water, 150 ml of 3.5 percent by weight ammonia water is passed through the ion exchanger, to wash out the methionine bound to the ion exchange resin. The eluate thus obtained is evaporated to dryness and the remaining solid substance is washed with ether a few times.

The product obtained consists of 7.1 g of L-methionine, having a specific rotation of:

$|\alpha|_D^{20} = +23.6°$ (C=5; 6 N · HCL)

The value of the specific rotation shows that the resulting L-methionine is optically pure, and that, hence, no racemization has occurred.

What is claimed is:

1. A process for preparation of an optically active form of methionine nitrile, said process comprising the steps of (1) treating a mixture of L and D-methionine nitrile in an inert, organic solvent, with an optically active form of α-phenoxypropionic acid at a temperature of about 0° C to about 50° C to produce a reaction mixture containing salts of said nitriles and said acid (2) separating the salts of said nitriles and said acid by isolating a fraction consisting mainly of one of the salt diastereo isomers, and (3) separating the diastereo isomers into an optically active form of methionine nitrile and the salt of α-phenoxypropionic acid.

2. The process as claimed in claim 1, wherein the resulting reaction mixture is optically separated by crystallization from a solvent.

3. The process as claimed in claim 2, wherein said solvent is selected from the group consisting of benzene, toluene and mixtures thereof.

4. The process as claimed in claim 2, wherein the reaction of said mixture and said acid is conducted in said solvent.

5. A process for preparation of an optically active form of methionine nitrile, said process comprising the steps of (1) adding an optically active form of α-phenoxypropionic acid to a solution of racemic methionine nitrile in a solvent selected from the group consisting of benzene, toluene and mixtures thereof, thereby producing a reaction mixture containing the diastereo salts of said nitriles and said acid, (2) subjecting the reaction mixture of the diastereo salts of said nitriles and said acid to fractional crystallization whereby one of the salt diastereo isomers crystallizes from said reaction mixture, (3) separating the crystals of one of the salt diastereo isomers from said reaction mixture, (4) mixing the separated crystals with benzene, toluene or ether, (5) adding ammonia to the suspension formed in step (4) whereby the salt diastereo isomer reacts with the ammonia producing the ammonium salt of α-phenoxypropionic acid which precipitates as a solid and the optically active form of methionine nitrile which remains dissolved in the solution, and separating the precipitated ammonium salt of α-phenoxypropionic acid from said solution containing the optically active form of methionine nitrile.

6. A process as claimed in claim 5 wherein the remaining reaction mixture of step (3) is treated with ammonia which reacts with the salt diastereo isomer remaining in said solution precipitating α-phenoxypropionic acid as ammonium salt from said reaction mixture with the other optically active form of methionine nitrile remaining in said reaction mixture and then separating the precipitated ammonium salt of α-phenoxypropionic acid from said mixture containing the other optically active form of methionine nitrile.

* * * * *